United States Patent [19]

Wiesspeiner

[11] Patent Number: 5,256,957
[45] Date of Patent: Oct. 26, 1993

[54] PROCESS AND CIRCUIT VERSIONS FOR CHARGING ACCUMULATORS

[76] Inventor: Gerhard Wiesspeiner, Rudolfstrasse 14, A-8010 Graz, Austria

[21] Appl. No.: 474,837
[22] PCT Filed: Mar. 10, 1989
[86] PCT No.: PCT/AT89/00027
§ 371 Date: Sep. 10, 1990
§ 102(e) Date: Sep. 10, 1990
[87] PCT Pub. No.: WO89/08940
PCT Pub. Date: Sep. 21, 1989

[30] Foreign Application Priority Data

Mar. 11, 1988 [AT] Austria .................................. 654/88

[51] Int. Cl.5 .............................................. H02J 7/10
[52] U.S. Cl. .................................... 320/20; 320/32; 320/39
[58] Field of Search .................. 320/20, 37, 39, 48, 320/32

[56] References Cited

U.S. PATENT DOCUMENTS

| | | | |
|---|---|---|---|
| 3,889,172 | 6/1975 | Lelaidier et al. | 320/39 |
| 3,890,556 | 6/1975 | Melling et al. | 320/21 |
| 3,946,299 | 3/1976 | Christianson et al. | 320/43 |
| 4,371,826 | 2/1983 | Shelly | 320/20 |
| 4,628,242 | 12/1986 | Scholefield | 320/2 |
| 4,628,243 | 12/1986 | Hodgman et al. | 320/2 |
| 4,692,680 | 9/1987 | Sherer | 320/2 |
| 4,710,694 | 12/1987 | Sutphin et al. | 320/21 |
| 4,745,349 | 5/1988 | Palanisamy et al. | 320/39 X |
| 4,746,852 | 5/1988 | Martin | 320/20 |
| 4,947,124 | 8/1990 | Hauser | 320/48 X |

FOREIGN PATENT DOCUMENTS

| | | |
|---|---|---|
| 3408657A1 | 9/1985 | Fed. Rep. of Germany . |
| 1489957 | 6/1967 | France . |
| 2137038 | 5/1971 | France . |
| 1390663 | 4/1975 | United Kingdom . |

*Primary Examiner*—R. J. Hickey
*Attorney, Agent, or Firm*—Watson, Cole, Grindle & Watson

[57] ABSTRACT

Process for charging accumulators and circuit versions for implementing said process. The charging state of a 100% charged accumulator is determined by the detection of an extreme value in the trend of a parameter (S), which is related to the inner voltage or the inner resistance of the accu. The extreme value can be detected by means of electronic analog-digital or computer circuits. These circuits can be produced by discrete or hybrid technology and can be integrated on a monolithic substrate. Besides an improvement in reliability, the process is applicable for charging undetermined accumulators directly out of unstable sources like solar generators, dynamos, weak supplies, or similar.

16 Claims, 4 Drawing Sheets

Equivalent Circuit

Fig. 4b: Hybrid

Protection Circuit protected Accu = p.a.

PROCESS AND CIRCUIT VERSIONS FOR CHARGING ACCUMULATORS

FIELD OF THE INVENTION

Adapted methods and circuits should make it possible without special know-how or manipulations for the user, to charge accumulators from unknown charging state in a minimum of time and to maintain the capacity over a long lifetime. The patent application describes inventions to control the energy supply during the charge of accumulators, for the protection against overcharging and the prevention of malfunction, caused by effects, which are independent of the charging state.

BACKGROUND OF THE INVENTION

Apart from actions against wrong treatment (e.g. reverse polarity, DE—3408657), several methods and circuits are proposed for the protection of accumulators from damage by overcharging.

It is well-known from literature (e.g. ISBN 3-7883-0142-2) that the break of the energy supply at predefined values (e.g. end-charging-voltage, current, temperature or -gradient, amount of charge, a.s.o.) is not a reliable criterion. Therefore it is proposed to use a certain feature in the trend of charging current or -voltage.

For example, the voltage trend of an empty cell shows a decrease during constant current charging (CCC) at the start, an increase until full charge, and thereafter again a decrease. A characteristic maximum appears. The final decrease is caused by overtemperature and pressure and may not exist in open cells. The (current-depending) voltage has reached a final value, which will not rise further (maximum), even under continuous energy supply.

Similar statements concerning the occurence of an extreme at full charge apply for the trend of the (inner) resistance of the cell and for the trend of the charging current at constant voltage charging (CVC).

At CCC it is known to break the charging current when the accumulator voltage has decreased for a certain degree (-dV method), or at CVC when the current, after having passed a minimum, is increasing (FR-A-1489957) to a predetermined level (U.S. Pat. No. 3,889,172).

A disadvantage of these methods is, that the accumulator will be overcharged and that the effect does not appear with open or leaking cells.

EP—0181112 discloses the turning point of the voltage curve to avoid overcharging in CCC. At this point the accumulator is not full-charged and the effect does not appear in a full-charged cell.

A charger for lead acid batteries is described in U.S. Pat. No. 4,710,694, which terminates the CCC at a predefined slope of voltage. An additional time limited charging step is needed to reach full charge. Because the slope depends on the number and capacity of the cells, this principle applies for semi-empty cells of a certain type and size only.

FR-A-2203198 discloses a charging method for lead acid batteries. The charging current is interrupted in intervals for a measurement cycle. Charging is terminated when the measured voltage is not higher than in the previous cycle. This feature characterizes the full cell, but it also occurs on empty accumulator or with changing temperature or current. Charging duration is significantly elongated by the interruptions of the charging cycle.

A further disadvantage of all previously described methods is the fact, that the criterion for terminating the charging summarizes different effects in one feature and cannot distinguish if they rely on the state of charge or are caused by other influences.

SUMMARY OF THE INVENTION

The new inventions differ from known principles by the fact, that not a simple measurement result (e.g. terminal voltage) is used for the determination of the charging state, but that, on the basis of the equivalent circuit diagram of the accumulator, a parameter (S) is derived from the trend of accumulator terminal voltage and charging current, which is related to the inner voltage or the inner resistance of the accumulator, and further processed.

FIG. 1a) shows the simplified equivalent circuit diagram of the accumulator. The internal resistance $(Rv+Rii)$, in series to the cell voltage (Uo), is composed of a serial connection of a portion Rv, which characterizes the empty cell, and the inner resistance Rii. which identifies the full charged accumulator. By the capacitor C, which is connected to the center oil both resistors and in parallel to Rii and Uo, the circuit components and their behavior can be identified with variations of current or voltage or from their frequency response. With that, the inner voltage Ui can be calculated, which describes the charging process more accurately than the terminal voltage Ua.

At the start of charging of an empty cell Uo will rise and Ui is not influenced by the high resistance Rvi, which is decreasing rapidly to a nearly constant value, resulting in a decrease of the terminal voltage Ua. This effect, as well as the resistance of the charging circuit R1 (leads, contacts) or its change, will cause malfunction in other charging processes With increasing charge, Rii and Uo will increase and reach a maximum value at full charge. This maximum identifies the fully charged accumulator and is therefore an ideal criterion for the control of battery chargers because this criterion is independent of the cell-type, -number, -capacity, -temperature, parasitic resistors and other influences.

The behavior of Rii modulates the measurable signals Ua and I, from which a parameter S can be extracted in many different ways, which will show, according to the invention, an extreme at the full charge state.

To reach full charge and to avoid overcharging it is recommended and disclosed for the first time, to switch off the energy supply, or to reduce it to harmless minimum rate, when a parameter S, which is related to Rii or Ui, reaches an extreme. By this the gradient dS/dt approaches zero.

Knowing the components of the equivalent circuit diagram, it is possible for the first time to take into account the reaction of the terminal voltage at changed operating conditions (e.g. fluctuation of current) and to clearly distinguish it from reaching the full charge state.

Thus, an additional separation against all other methods is given, because neither charging current nor charging voltage have to be adjusted to constant values.

PROGRESS

Apart of the already mentioned advantages, like avoiding incomplete charge or overcharging, no additional sensors are required for the recognition of an extremum and only two simple wires are sufficient for connecting the accumulator. Furthermore, the same circuits can be used for different accumulators and do not need calibration settings in production.

A further progress is that no constant control switch is necessary any more, which brings great advantages in charging of accumulators out of dynamos, in energy recovery and in solar generators.

TECHNICAL REALIZATION

Methods, circuits and programming techniques for the calculation of a parameter out of some values and for recognition of extremes (minimum/maximum) are already known from the literature (analog, digital, computer). As these are complex operations during slow processes with slight alterations, using a microprocessor with analog interface is preferable. In principle, all circuits come into consideration which carry out processing of measured values combined with extremum recognition, comparison operation, energy switching action. These circuits may be discrete components, hybrid or monolithic IC or they can also be realized in their function by means of the program of a computing device (e.g. Process Controller, Microprocessor).

Although the basic function of the above mentioned circuits and components and electronics and also the necessary programming techniques are well known to the expert, their application for the claimed control of accumulator charging is new and not obvious.

BRIEF DESCRIPTION OF THE DRAWINGS

FIGS. 3a–3c illustrate in schematic block form further alternative embodiments for implementing the present invention;

FIGS. 4a–4d illustrate an embodiment of the invention employing hybrid or integrated circuit technology to form circuit elements;

FIG. 1b) shows one possible realization for the charging process according to the present invention. Current- and voltage-meter feed measurement dependent signals f(I) and f(U) R. Fed to the calculation circuit. In this calculation circuit these signals are processed and a subsidiary parameter value (S) is calculated, which is related to the inner resistance (Rii) or the inner voltage (Ui). With the help of differentiator or by intermediate storage and subtraction or by other applied means, the derivative dS/dt can be obtained as a signal and fed to a comparator, which will terminate the main charging process by actuating a switch or other means to reduce the supplied energy to a harmless value.

By different mathematical or technical operations a high number of different parameters (S) can be created, which are characterized by the disclosed behavior of the inner resistance (Rii) showing a maximum at full charge. For the basic idea of the invention it is of no importance if S is represented by Rii itself, or the equivalent transconductance (1/Rii), or the resulting inner voltage Ui, or another parameter, related on the behavior of Rii coming into effect in the simplified equivalent circuit diagram. Normally the substitute parameter S will also approach an extreme at full charge, but it is also possible to calculate derivatives (S') with other, predictable, results. Such a manipulation of a Rii related parameter is assumed to be covered by the disclosed invention, especially because they rely on the same basic idea and, vice versa, the parameter S could be calculated out of S'.

The components of the equivalent circuit diagram for the accumulator or their behavior (e.g. time constant) can be obtained from the change of charging current. This current change has to be of short duration compared to the charging process and can occur by itself (e.g. dynamo) or can be forced; in any way it occures at least during switch-on.

Thus, the voltage loss in the charging circuit or the voltage change caused by a current change can be taken into account in the calculation circuit.

Figure 1A:
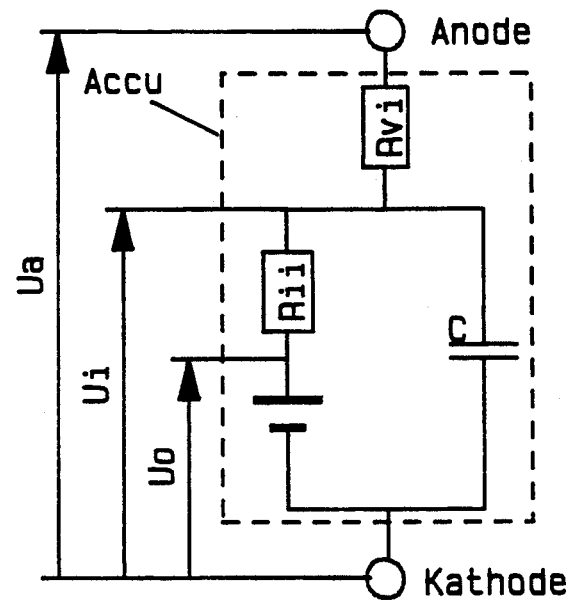
FIG. 1a is a schematic diagram of an equivalent circuit illustrating an accumulator or battery to be charged in accordance with the present invention.
Figure 1B:
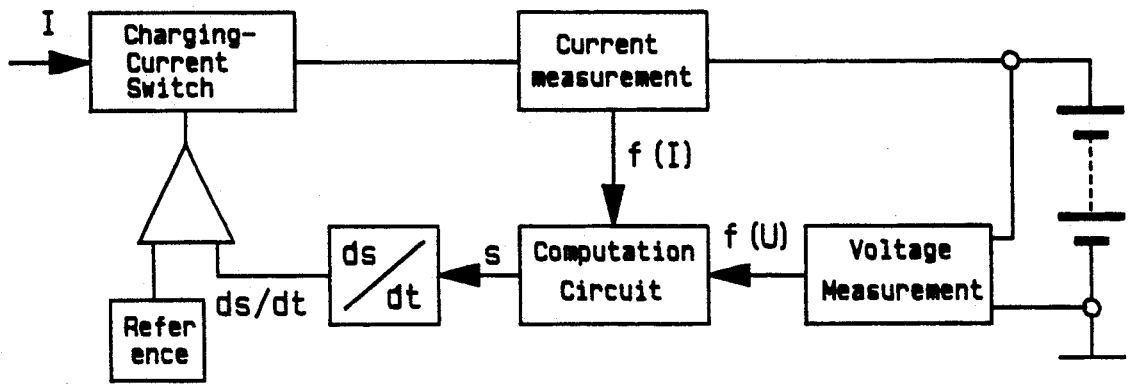
FIG. 1b is a schematic diagram in block form illustrating in general terms a circuit for implementing the present invention.
Figure 1C:
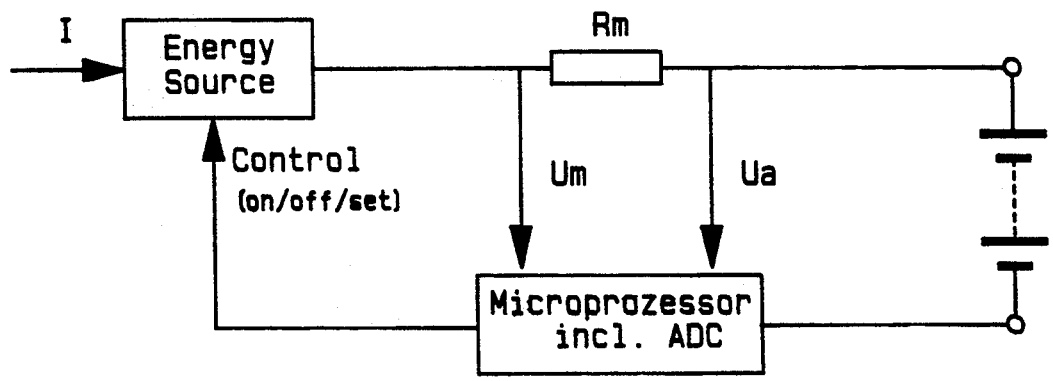
FIG. 1c is a schematic diagram in block form illustrative of an alternative embodiment of the invention employing a microprocessor.

FIG. 1c.) shows another possible way of realization. A microcomputer (MC) with analog interface is used for measurement and control. In this example the current meter is substituted by a simple resistor Rm. Across Rm the potentials for terminal voltage (Ua) and charging current (Um-Ua) can be obtained, sampled, and the parameter S can be calculated out of it. The value of S is stored as S1 and after a delay time S2 is calculated in the same way. When the gradient dS/dt, in this case (S2−S1), approaches zero, the MC will terminate charge by control of the energy source, preferably by switchoff.

Like in the previous example as in following examples, the energy source may also consist of a constant current or a constant voltage source, as long as an Rii related parameter is processed. In this case there is no need to measure the constant given values, because they are well known to the circuit.

If the mentioned sources are programmable to controlled settings, continuously or stepwise, the MC or a control logic can evoke the described variations needed for the calculation of the components of the equivalent circuit and their behavior.

Often a pulsating current, as it occurs with rectification of AC line voltage, is used, to simplify charging of accumulators. Using DC with superimposed alternating current, like a pulsating current, some advantages can be obtained not disclosed before.

Figure 2A:
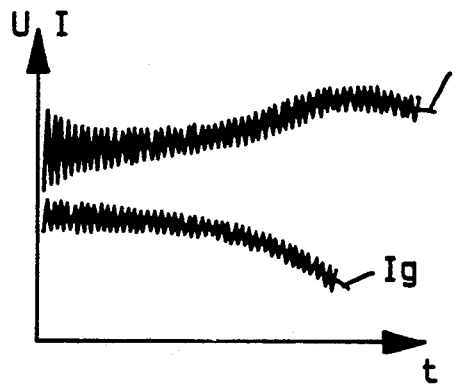
FIGS. 2a and 2b illustrate various wave forms for use in the process of the invention.
Figure 2B:
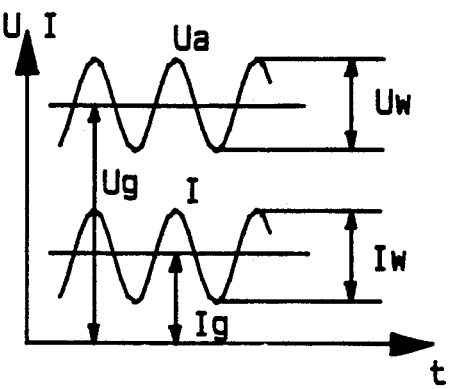
Figure 2C:
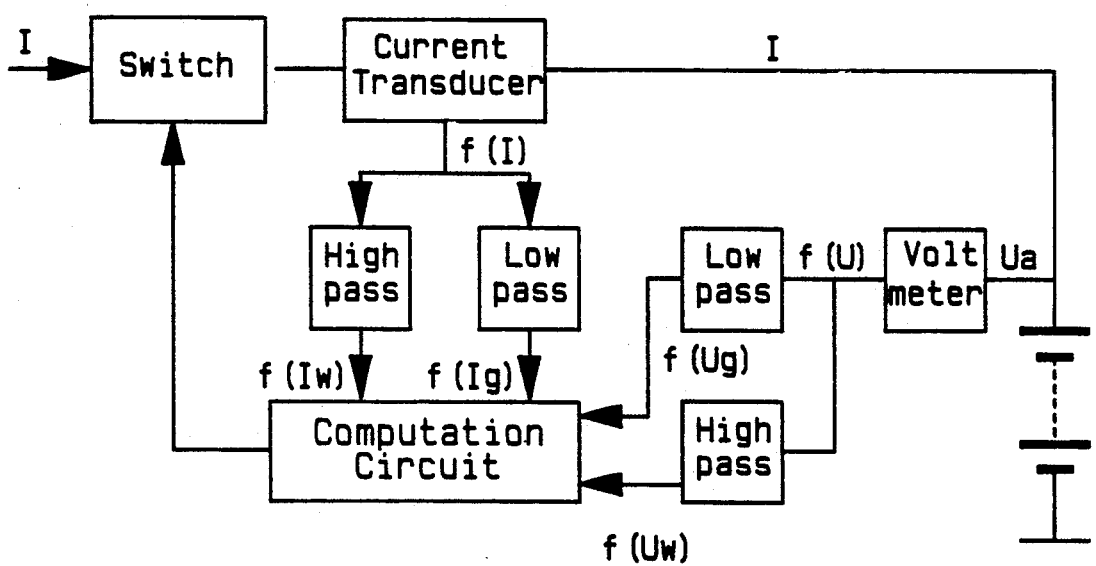
FIG. 2c illustrates in schematic block form a circuit responsive to certain ones of the wave forms illustrated in FIGS. 2a and 2b for deriving certain other wave forms illustrated therein.

FIGS. 2a,b) show the time course of accumulators voltage (Ua) and of charging current (I) with the pulsating alternating components (Uw,Iw) and the slow mean values (Ug,Ig) for trend recognition along the charging process. As the time constant of the accumulator which is established by the accumulator components (Rvi,C,Rii) compared to the frequency of the alternating component is high, the resistance of the charging circuit $Rl = Uw/Iw$ and the inner voltage $Ui = Ug - Ig*Rl$ can be calculated out of the relation of the amplitude of alternating voltage and the amplitude of alternating current. At fluctuations of the mean charging current (Ig), the influence of the time constant (Rv,C,Rii) can be taken into account.

For the above described calculation of Rl, Ui and the parameter (S), the DC- (Ug,Ig) and AC-components (Uw,Iw) of charging current (I) an accumulator terminal voltage (Ua) can be derived by means of suitable circuits (e.g. filters, pulse-synchronous sampling, digital calculating units, aso.).

Simplification of the technical realization can be achieved by taking the pulsations out of the alternating line voltage by means of rectification at the moment when the current is zero or in its minimum. The voltage measured at this point is then Ui, because of the lack of voltage loss in the charging circuit R1.

The definition against other methods is given by the fact, that no constant DC is needed, that charging current needs not to be switched off, that a parameter related to Ui is processed.

Figure 3A:
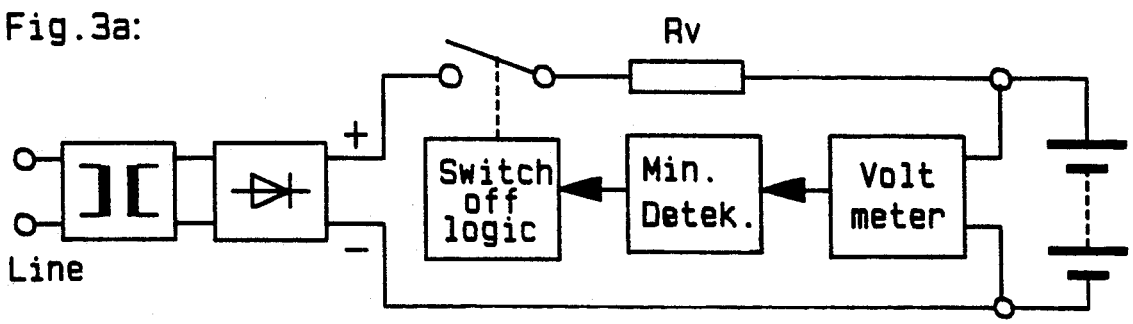

FIG. 3 shows a possible way of realization. The charging current can easily be adjusted by means of a resistor Rv. By means of a suitable detector, the minimum of single pulses is used (Um) for calculating of S out of the ripple component of accumulator voltage and is fed to the switch-off recognition logic.

Gassing at overcharge is avoided, if the inner accumulator voltage remains under a certain value. Common constant voltage charging is not suitable very much, because voltage losses at different inner resistances remain unconsidered. According to the invention, this problem can be solved by determining the inner accumulator voltage (Ui) and comparing it to the set value and to readjust it, so that the inner voltage Ui meets the pre-set value.

As a possible way of realization, a programmable current source, e.g. a switching controller, feeds the accumulator. The accumulator terminal voltage (Ua) is measured and by means of the flow of current known (fI), the inner accumulator voltage is found out. In the case of misalignment from the set point, current is readjusted.

In many cases, it is desirable to charge accumulators of different capacity with an optimal charging rate. In common, one must know the capacity, to which charging current has to be adjusted by the user. An automatic adjustment of charging current to cell capacity is reached then, when—according to this invention—the gradient of the inner accumulator voltage (dUi/dt) is controlled by means of current regulation.

Practical realization can be achieved with the circuitry described before, when a error-signal of the said gradient drives a programmable current source.

At constant voltage charging of accumulators in serial connection, charging voltage has to be pre-set, according to the number of cells. An automatic adjustment would be of more advantage. This advantage can be realized—according to the invention—in that way, that first of all the open-circuit voltage is measured and starting out from this, charging voltage is raised stepwise or continuously up to the occurrence of a minimal current.

As a possible way of realization, a microprocessor compares the current flow (I) from a voltage regulator with a given value. If the current is smaller than the set value, a higher voltage is adjusted at the voltage regulator. If the current is reached, this adjusting process is terminated and the charging voltage remains set.

Usually, charging circuits need a number of electronic components, single elements and a controller which have to be assembled. Many of the methods, principles and circuit versions presented in this paper can be realized by using only a few semiconductor elements, which can be built in a single case and thus represent a new element of smart power electronics.

Figure 4A:
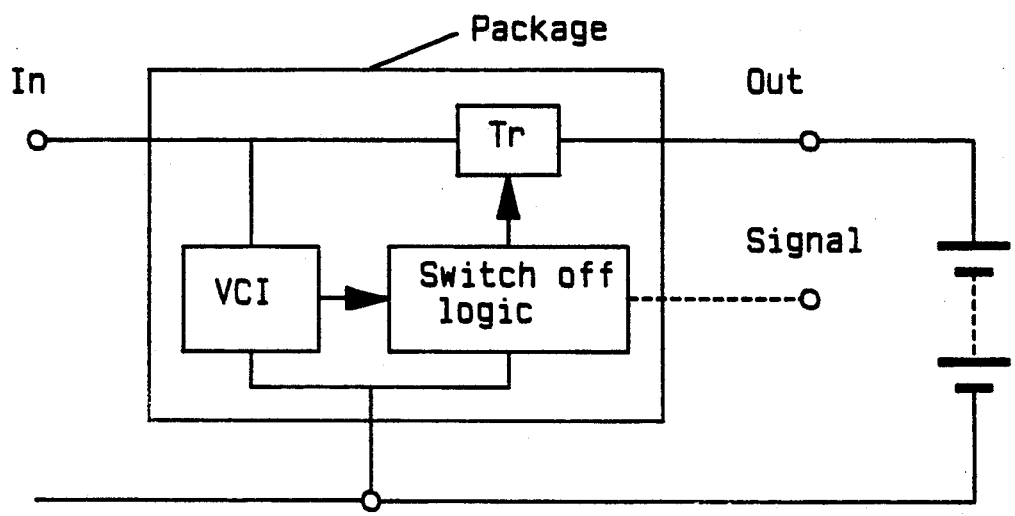
Figure 4A:
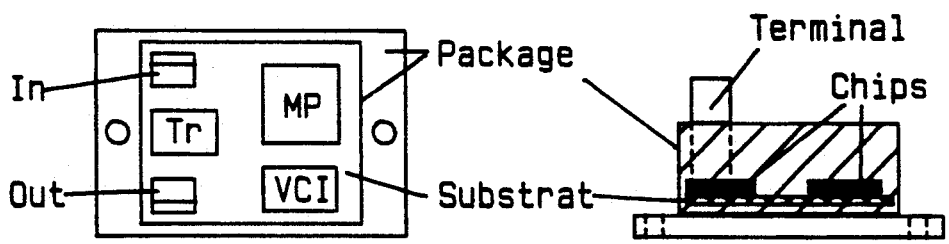

FIG. 4a shows an equivalent circuit and FIG. 4b a variation in hybrid technology. On a substrate, e.g. a single chip microcomputer (MP) as measuring and control logic, a power transistor (Tr) as a charging current regulator and an internal voltage supply (VCI) are placed and functionally connected. Only three terminals are needed for the connection of power supply and accumulator. Additional connections can be realized, e.g. to signalize the state of charge. The total circuit is built into one case, thus being a single element.

Figure 4C:
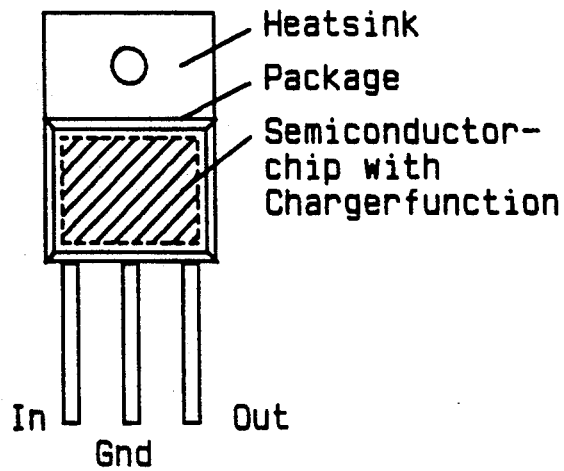

Another realization is shown in FIG. 4c. The total circuit is integrated on a semiconductor chip and built in a standard case with only 3 pins. Here also, some connections can be planned for additional signal presentation.

Figure 4D:
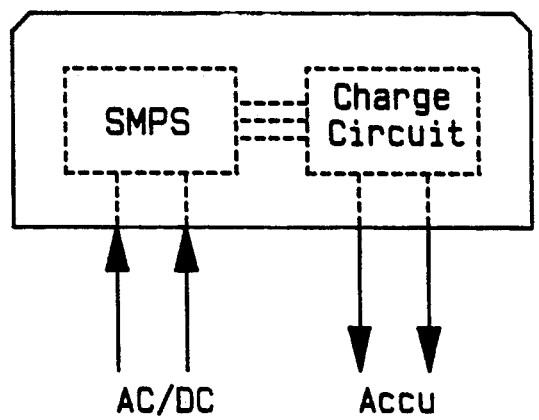

Another simplification for the user is given, if—in addition to the charging control circuit—also the rectifier and possibly a switch mode controller (SMPS) are integrated into one element. Such an element can be realized with a minimum of four connections and results in a significant simplification in the production of accumulator charging devices (FIG. 4d).

Regenerating of accumulators requires repeated (full-) charging and (complete) discharging. According to the invention, this process is automated in that way, that a controller (e.g. microcomputer) alternately activates means for charging the accumulator (e.g. as described) and then means for discharging it (e.g. a current sink) until a pre-defined discharge voltage is reached. Another feature of this invention is that the said procedure is repeated as often as discharge capacity increases. The increase of discharge capacity can be evaluated e.g. by measurement and integration of the discharge current over the time or of the discharge time at given a discharge current.

Accumulator charging devices are expected to be used in various and universal ways. By the common arrangement of a charging and discharging circuit, accumulators can be tested for their function and capacity and they can also be regenerated, if required. Displaying of the charged or discharged capacity is a helpful tool for the user.

Automatic adjustment of charging current and voltage enables even non-experts to perform optimal charging, testing or regenerating of various accus by means of choosing the operation mode with keyboards, switches or other means.

Figure 5:
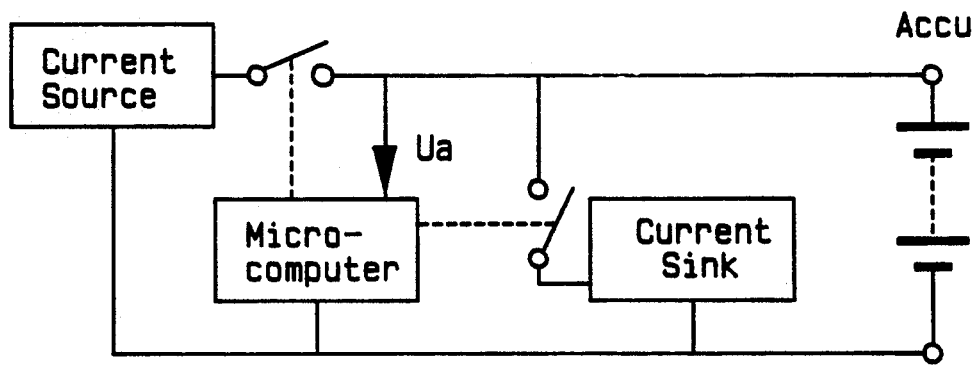
FIGS. 5–6 illustrate in schematic block form alternative embodiments of a circuit for regenerating an accumulator by means of a discharge circuit.
Figure 6:
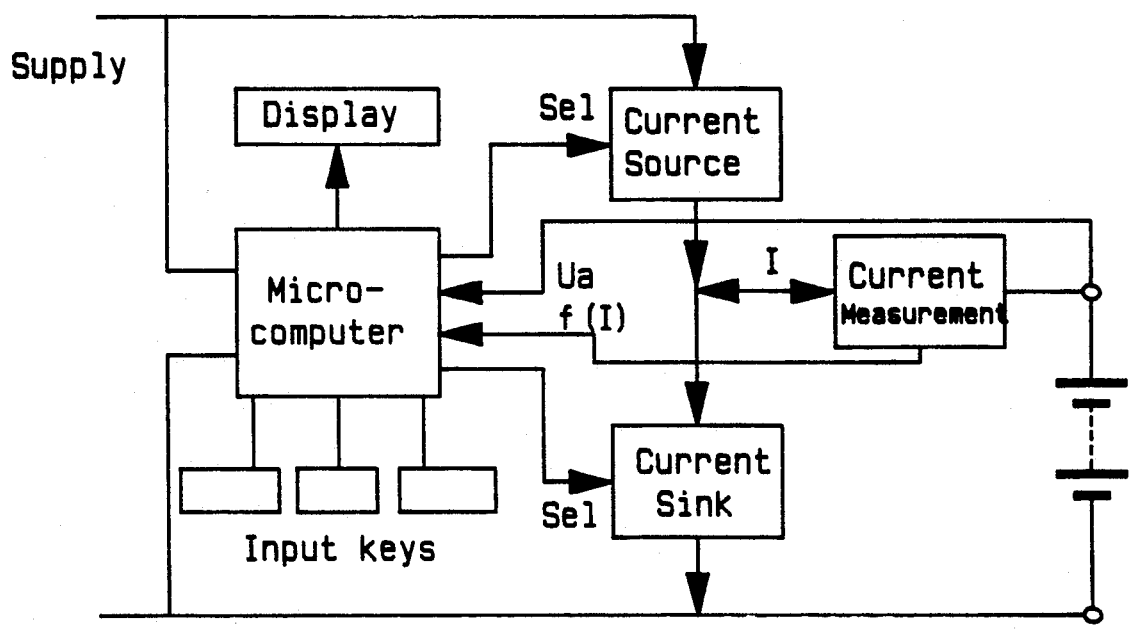

FIG. 5 shows one of the possible ways of realization. A microprocessor is programmed in that way that on key-command a charging or discharging circuit, respectively which both are connected to the accumulator, are activated according to the called function. Charge- and load-current is recorded with a current measurement circuit, calculated in the microcomputer and displayed.

Depending upon the way of production and also their age, accumulators of the same type and size show different capacities. In serial connection, the amount of charge to be stored is limited by the capacity of the worst. At complete discharging inequal capacities will result in voltage reversion and irreversible damage of the weakest. Switching off of a single accu interrupts the current flow through the total series, whereby also the capacity of the other accus is lost.

Figure 7:
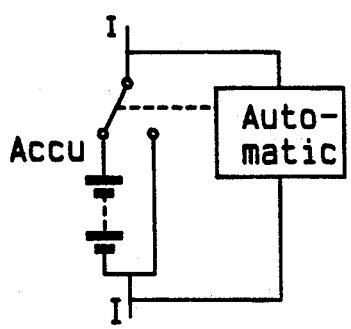
FIGS. 7–9 are diagrams illustrating various protection devices for switching one or more accumulators out of circuit with a charging device whereby the accumulators are individually not overcharged.

According to this invention and FIG. 7), not a circuit breaker, but an alteration switch is planned, taking the accumulator out of serial connection at complete charge or discharge and switching the current over to a by-pass line, so that the circuit of serial connection remains closed. The alteration switch is operated by a control-logic, working dependent of the charging state of the accumulator.

Figure 8:
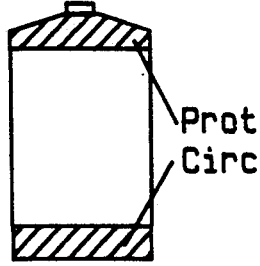

An improvement in reliability and a simplification in the use of accumulators is achieved, when the said circuits are protecting each single accumulator and will not form an separate device. Due to the size or accus and by the utilization of the appropriate technology (e.g. semiconductor chip, hybrid) it is possible to install the mentioned control-, protection-, and charging- electronics inside of the accu or as a supplimental part. (FIG. 8)

Figure 9:
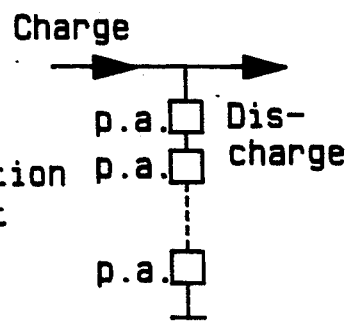

In several cases, especially if a high amount of cells has to be used, it is better (e.g. more cost effective) to protect groups of single cells. A realization example is given in FIG. 9.

I claim:

1. A process for quickly charging at least one accumulator to a terminal voltage with a variable charging current comprising the steps of:
    characterizing the accumulator by an equivalent circuit including an inner variable resistance having a value which is a function of the charging state of the accumulator during the charging process;
    applying the charging current at a selected terminal voltage to the accumulator;
    at least one of measuring both the charging current and the terminal voltage and adjusting at least one of the both to a known value and measuring the other;
    calculating from a temporal time course of the charging current and the terminal voltage a parameter (S) representative of at least one of the inner resistance and the inner accumulator voltage, and calculating dS/dt, the gradient of (S) with respect to time;
    reducing the applied charge when the gradient is substantially equal to zero at a maximum value of the inner resistance indicative of a full charge state of the accumulator.

2. The process of claim 1, wherein applying the charging current comprises varying at least one of the terminal voltage and the current.

3. The process of claim 1, including the step of filtering variations in the applied charging current to derive a time varying signal corresponding to the parameter (S).

4. The process of claim 1, further comprising deriving a gradient of the accumulator voltage and setting the gradient to a reference by adjusting the current.

5. The process of claim 23, further including adjusting the accumulator voltage until a selected minimum of said charging current is achieved.

6. The process of claim 1, further comprising rapidly discharging the accumulator for regenerating its charge capacity.

7. The process of claim 1, wherein the at least one accumulator includes a plurality of such accumulators connected in series and the method further includes the step of selectively b-by-passing individual accumulators upon reaching a predetermined charge level indicative of a full charge condition for preventing said selected accumulators from becoming overcharged.

8. The process of claim 1 further including the steps of transforming and rectifying a line voltage for providing a pulsating DC charging current and measuring the accumulator voltage in sync with minimum values of the pulsating current for deriving (S) from said measured accumulator voltage.

9. Apparatus for quickly charging at least one accumulator to a terminal voltage with a variable charging current wherein said accumulator is characterized by an equivalent circuit including an inner resistance having a value which is a function of the charging state of the accumulator during the charging process comprising:
    means for establishing charging current and terminal voltage for the accumulator;
    source means for applying the charging current to the accumulator at a selected terminal voltage;
    means responsive to time variations in the charging current and terminal voltage for calculating a parameter (S) representative of at least one of the inner resistance and the inner accumulator voltage;
    means for calculating the dS/dt, the gradient of (S) with respect to time;
    means responsive to the gradient and the parameter (S) for reducing the applied charge when the gradient is substantially equal to zero at a maximum value of the inner resistance indicative of a full charge state of the accumulator;
    source means for applying the charging current to the accumulator.

10. The apparatus of claim 9, wherein the source means is operative to produce a varying input to the accumulator and further including filtering means responsive to the current and the voltage for producing time varying signals representative thereof.

11. The apparatus of claim 9, further including switch-off logic means coupled to the source and responsive for selectively switching the source into and out of circuit with the accumulator.

12. The apparatus of claim 9, further including means coupled to the logic means for periodically rapidly discharging the accumulator for regenerating its charge capacity.

13. The apparatus of claim 9 wherein a plurality of such accumulators are connected in series and further including means for selectively by-passing individual ones of the accumulators upon reaching a predetermined charge level indicative of a full charge condition for preventing said selected accumulators from becoming overcharged.

14. The apparatus of claim 9, including means for adjusting at least one of the terminal voltage and the charging current.

15. The apparatus of claim 9, further including means for measuring at least one of the terminal voltage in the charging current.

16. The apparatus of claim 9, further including means for sensing the inner voltage corresponding to the inner resistance for the equivalent circuit for automatically adjusting the charging current and accumulator voltage to the specific connected accumulator.

* * * * *